June 19, 1928.
J. BETHENOD
1,673,796
RADIO RECEIVING SYSTEM
Filed May 26, 1922
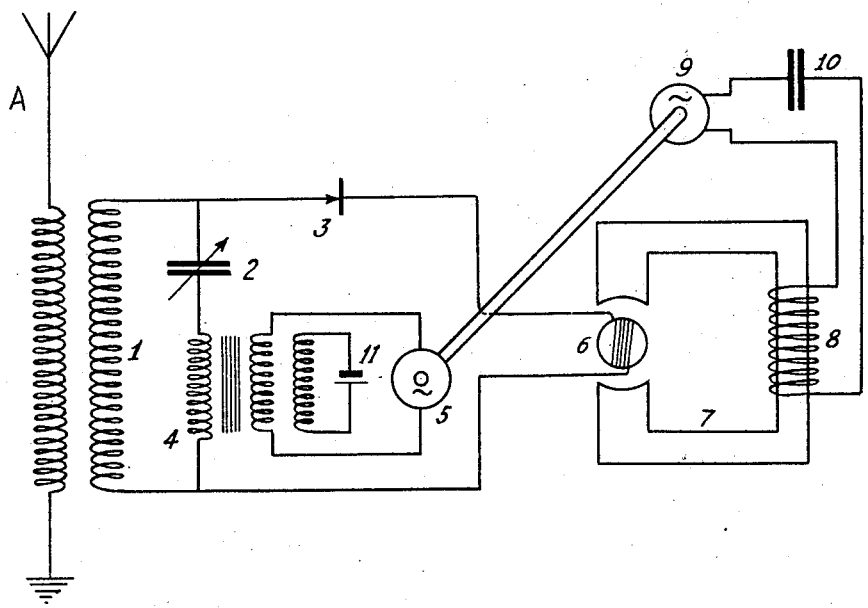
Inventor
JOSEPH BETHENOD
By his Attorney Ira J. Adams Patented June 19, 1928.

1,673,796

UNITED STATES PATENT OFFICE.

JOSEPH BETHENOD, OF PARIS, FRANCE.

RADIO RECEIVING SYSTEM.

Application filed May 26, 1922, Serial No. 563,766, and in France June 10, 1921.

The present invention relates to a new method for eliminating or at least attenuating atmospheric disturbances at wireless telegraph receiving stations.

In order to attain this object the received current is modulated by detecting it in a manner to obtain a high frequency current, preferably ultra-musical, that is, above the audio frequency range. A current thus generated is sent into the armature winding of a relay acting like a motor whereby the armature is subjected to a turning moment. The energization of the field of this relay is effected by means of a sine-wave current of the same frequency as the current obtained after detection. Under these conditions, only the currents that are useful in receiving give a resultant turning moment that is not zero, and cause the armature of the relay to rotate. This armature may carry any suitable recording device. On the other hand, the atmospherics give a resultant turning moment the mean value of which is zero, or at least very feeble.

The invention is illustrated by way of example in the single figure of the drawing. 1 represents the secondary winding of a coupling transformer traversed, for example, by the high frequency currents received by a wireless telegraph station. These currents may be subjected to a preliminary amplification, in a well known manner, by means of amplifiers of any well known type, not shown, inserted between the antenna A, and the winding 1. 2 represents an adjustable condenser by means of which the high frequency circuit 1, 2 may be tuned to the frequency of the received currents. These currents are rectified by means of a detector 3 of any well known type after having been modulated by any suitable arrangement. In the drawing a transformer 4 is shown having the secondary in series with condenser 2, and the iron magnetic circuit of which is periodically saturated by means of a second winding traversed by the current of an alternator 5 of suitable frequency. The resultant detected current corresponding to the frequency of the beats is sent into the armature winding 6 of a dynamometer relay to which any suitable indicator, such as a pointer, or means for closing a local circuit (not shown) is connected. The dynamometer has a magnetic circuit 7 energized by the coil 8 which receives the current from a second alternator 9. The current supplied by the alternator 9 is of the same frequency as the signal current in the armature winding 6 and is substantially in phase therewith, resulting in a maximum deflection of the armature when signal currents flow in the armature winding; while oscillating currents due to certain static or atmospheric disturbances, flowing in armature winding 6, and out of phase with the alternator current cause zero or substantially zero deflection of armature 6. The alternator 9 is synchronously driven with the alternator 5 or combined in a single structure. A condenser 10 may be inserted in the local circuit in the well known manner for the purpose of increasing the power factor in this circuit, and for freeing it of all harmonics.

Numerous modifications may be made without departing from the invention. The modulating circuit may comprise a direct current source 11 that varies the effect of saturation of the core of 4.

The present arrangement may be combined with other protecting systems known or subsequently discovered for the same purpose, such as an antenna detuned with respect to the wave length of the sending station; supplementary dampening, etc. Preferably, the circuit 1 will be supplied with a current resulting from a first detection and the modulation of the antenna current at ultra-acoustic frequency will be effected afterwards.

Having described my invention, what I claim is:

1. The method of detecting electrical oscillations which consists in modulating the received currents at a certain frequency at the receiving station, rectifying the modulated currents, producing an alternating magnetic field of the same frequency as the rectified currents, and utilizing the resultant effect produced by the alternating magnetic field and the magnetic field due to the rectified currents to indicate the received currents.

2. The method of detecting electrical oscillations which consists in modulating the received currents at the receiving station at a frequency above the audio frequency range, rectifying the modulated currents, producing an alternating magnetic field of the same frequency as the rectified currents, and utilizing the resultant effect produced by the alternating magnetic field and the magnetic field due to the rectified currents to indicate the received currents.

3. A system for receiving and detecting electrical oscillations comprising a receiving station, means at said receiving station for modulating the received currents at a certain frequency and rectifying them, means for producing currents of the same frequency as the rectified currents, and means responsive to the resultant magnetic field due to said rectified currents and said locally produced currents.

4. A system for receiving and detecting electrical oscillations comprising a receiving station, means at said receiving station for modulating the received currents at an inaudible frequency and rectifying them, means at said receiving station for producing currents of the same frequency as the rectified currents, and means responsive to the resultant magnetic field due to said rectified currents and said locally produced currents.

5. A system for receiving and detecting electrical oscillations comprising a receiving station, means at said receiving station for modulating the received currents at a certain frequency and rectifying them, means at said receiving station for producing currents of the same frequency as said rectified currents and a dynamometer having one of its elements energized by the rectified currents and the other energized by the locally produced currents.

6. A system for receiving and detecting electrical oscillations comprising a receiving station, means at said receiving station for modulating the received currents at an inaudible frequency and rectifying them, means at said receiving station for producing currents of the same frequency as said rectified currents and a dynamometer having one of its elements energized by the rectified currents and the other energized by the locally produced currents whereby said dynamometer will give maximum response to said rectified currents and substantially no response to currents of other frequencies.

7. A system for receiving and detecting electrical oscillations comprising a receiving station, means at said receiving station for modulating the received currents at a certain frequency and rectifying them, means at said receiving station for producing currents of the same frequency as said rectified currents and in phase therewith and a dynamometer having one of its elements energized by the rectified currents and the other by said locally produced currents whereby said dynamometer will give maximum response to said rectified current and substantially no response to currents of other frequencies or currents out of phase with said rectified currents.

8. A system for receiving and detecting electrical oscillations comprising means for modulating and rectifying the received currents at a certain frequency, a dynamometer having one of its elements energized from said modulating means and the other energized by said rectified currents whereby the dynamometer will give maximum response to said rectified currents and substantially no response to currents of other frequencies.

JOSEPH BETHENOD.